United States Patent
Friedman et al.

(10) Patent No.: US 6,444,311 B1
(45) Date of Patent: Sep. 3, 2002

(54) IMPACT RESISTANT PROTECTIVE MULTILAYER FILM

(75) Inventors: Michael Friedman, Wayne; Xixian Zhou, Hardyston, both of NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 0 days.

(21) Appl. No.: 09/419,760

(22) Filed: Oct. 19, 1999

(51) Int. Cl.$^7$ .......................... B32B 27/06; B32B 27/28; B32B 27/30; B32B 33/00
(52) U.S. Cl. .......................... 428/354; 428/355 AC; 428/421; 428/422; 428/520; 428/523; 428/914
(58) Field of Search .......................... 428/31, 195, 354, 428/355 AC, 421, 422, 520, 914, 523

(56) References Cited

U.S. PATENT DOCUMENTS

| | | | |
|---|---|---|---|
| 3,253,060 A | 5/1966 | Koblitz et al. | 525/199 |
| 3,454,518 A | 7/1969 | Kelly | 524/520 |
| 3,458,391 A | 7/1969 | Miller, Jr. | 428/204 |
| 3,524,906 A | 8/1970 | Schmitt et al. | 525/199 |
| 3,755,496 A | 8/1973 | Koizumi et al. | 524/386 |
| 3,968,196 A | 7/1976 | Wiley | 264/174.1 |
| 4,141,873 A | 2/1979 | Dohany | 524/107 |
| 4,179,542 A | 12/1979 | Christofas et al. | 428/324 |
| 4,221,757 A | 9/1980 | Strassel | 264/173.13 |
| 4,272,585 A | 6/1981 | Strassel | 428/413 |
| 4,317,860 A | 3/1982 | Strassel | 428/421 |
| 4,317,861 A | 3/1982 | Kidoh et al. | 428/421 |
| 4,345,057 A | 8/1982 | Yamabe et al. | 526/247 |
| 4,364,886 A | 12/1982 | Strassel | 264/171 |
| 4,415,519 A | 11/1983 | Strassel | 264/171 |
| 4,444,826 A | 4/1984 | Sasaki et al. | 428/216 |
| 4,510,282 A | 4/1985 | Goll | 524/337 |
| 4,546,149 A | 10/1985 | Kidoh et al. | 525/199 |

(List continued on next page.)

FOREIGN PATENT DOCUMENTS

| | | |
|---|---|---|
| EP | 0 060 421 B1 | 9/1982 |
| EP | 0 677 381 A1 | 10/1995 |
| JP | 5159971 | 5/1976 |
| JP | 618349 | 1/1986 |
| JP | 6490733 | 4/1989 |
| JP | 2030528 | 1/1990 |
| JP | 07076676 | 3/1993 |
| WO | WO 94/12583 | 6/1994 |

OTHER PUBLICATIONS

Derwent Abstract 1988–162927, Dec. 1998.*
Brydson, J.A., Plastic Materials, Robert E. Krieger Publishing Co., Inc., Huntington NY, p. 312, Jan. 1975.
Bassett, D.C., Developments in Crystalline Polymers—I, Applied Science Publishers, NJ, pp. 195, 256–263, Jan. 1982.

*Primary Examiner*—Paul Thibodeau
*Assistant Examiner*—Ramsey Zacharia
(74) *Attorney, Agent, or Firm*—Jeffrey C. Lew

(57) ABSTRACT

A clear multilayer film for coating synthetic environmental surfaces includes an exposed protective layer and an underlying cushioning layer. The exposed layer is primarily a polymer blend of a fluorine substituted olefin polymer, such as polyvinylidene fluoride, with an acrylic polymer. The cushioning layer is of a low modulus polymer selected from among impact modified acrylic polymer, ethylene vinyl acetate polymer and metallocene catalyzed polyethylene and having an elastic modulus below about 30,000 psi (207 MPa). The cushioning layer should be substantially free of all fluorinated polymers. The multilayer film can have an optional additional thermally adhesive layer of a blend of a fluorine substituted olefin polymer with an acrylic polymer. The multi layer film offers superior protection to such substrates as outdoor building siding, vehicle body panels, and signs from stains, weather conditions, and especially impact damage. Ally of the layers can also include fillers and additives adapted to provide a very low gloss appearance.

15 Claims, 1 Drawing Sheet

U.S. PATENT DOCUMENTS

| | | | | |
|---|---|---|---|---|
| 4,585,701 A | 4/1986 | Bartoszek et al. | ........... | 428/421 |
| 4,659,625 A | 4/1987 | Decroly et al. | .............. | 428/412 |
| 4,677,017 A | 6/1987 | DeAntonis et al. | ......... | 428/214 |
| 4,804,713 A | 2/1989 | Akiyama | .................... | 525/185 |
| 5,030,676 A | 7/1991 | Wallen | ........................ | 524/182 |
| 5,079,296 A | 1/1992 | Thompson et al. | ............ | 525/71 |
| 5,132,164 A | 7/1992 | Moriya et al. | ............... | 428/199 |
| 5,139,878 A | 8/1992 | Kim et al. | ................... | 428/421 |
| 5,180,634 A | 1/1993 | Sempio et al. | ............... | 428/336 |
| 5,183,851 A * | 2/1993 | Visani et al. | .................. | 525/85 |
| 5,242,976 A | 9/1993 | Strassel | ........................ | 525/72 |
| 5,252,664 A | 10/1993 | Thompson et al. | ............ | 525/71 |
| 5,256,472 A | 10/1993 | Moriya et al. | ............... | 428/215 |
| 5,284,710 A | 2/1994 | Hartley et al. | ............... | 428/421 |
| 5,322,899 A | 6/1994 | Grunewalder et al. | ...... | 525/199 |
| 5,336,719 A | 8/1994 | Thompson et al. | ............ | 525/71 |
| 5,506,031 A | 4/1996 | Spain et al. | ................. | 428/172 |
| 5,662,977 A | 9/1997 | Spain et al. | .................. | 428/42.1 |
| 5,688,581 A * | 11/1997 | Chagnon et al. | ............. | 428/195 |
| 5,707,697 A * | 1/1998 | Spain et al. | ................... | 428/31 |
| 5,749,658 A * | 5/1998 | Kettner | ........................ | 383/204 |
| 5,770,318 A | 6/1998 | Friedman | ..................... | 428/500 |
| 5,792,560 A | 8/1998 | Friedman et al. | ............ | 428/441 |
| 5,817,386 A | 10/1998 | Adamko et al. | ............. | 428/41.3 |
| 6,228,486 B1 * | 5/2001 | Kittel et al. | ................. | 428/354 |

* cited by examiner

IMPACT RESISTANT PROTECTIVE MULTILAYER FILM

FIELD OF THE INVENTION

This invention relates to protective films for decorative, primarily outdoor structures, such as building siding, signs, and vehicle body panels. More specifically, it relates to a multilayer film including a weather-resistant protective layer of a fluoropolymer/acrylic polymer alloy bonded to an adjacent cushioning layer of an impact-resistant, low modulus, thermoplastic polymer.

BACKGROUND AND SUMMARY OF THE INVENTION

In recent years the commercial significance of decorative marking of rigid and flexible, interior and exterior walls and panels has continued to develop. The applications for decoratively marked surfaces are pervasive. They may be found for example on outside building walls of aluminum or polyvinyl chloride (PVC) siding, fence elements, billboards and road signs, exterior truck, bus and airplane panels, and interior bulkheads of passenger cabins of boats, airplanes and railroad cars.

There has been a continuing need to protect these decoratively marked surfaces against weathering, chemical corrosion, staining and other degradation processes. A technology that has developed to serve this need involves covering a decoratively marked surface with a protective film. It has been found that films containing fluoropolymers, especially polyvinylidene fluoride (PVDF), are very weather, corrosion and stain resistant. Hence, fluoropolymers are widely used in corrosion resistant pipes, plates and sheets, and paints for protective coating or laminating of interior stain resistant articles, exterior weathering or chemical corrosion-susceptible articles, such as vinyl siding, window frames, signs, awnings, and so forth.

Unfortunately, many fluoropolymers including PVDF are also incompatible, and thus, nonadhesive to many substrates for which surface protection is often desired. One method of improving adhesion of a fluoropolymer to certain suitable substrates, such as PVC or polycarbonate, involves providing an intermediate adhesive layer comprising an acrylic resin. Because vinylidene fluoride and acrylic resin are miscible over a very wide concentration range in the amorphous state, adhesion is improved somewhat. Host ever, the fluoropolymer and adhesive layers are preferably applied simultaneously in an extrusion or lamination process. This process does not provide sufficient surface interaction between fluoropolymer and adhesive layers to overcome the inertness to the fluoropolymer so as to achieve satisfactory adhesion.

Another approach has been to mix a fluoropolymer with acrylic resin in melt or solution to make an alloy that may be coated, laminated, molded, or extrusion cast onto substrates thereby forming a monolayer protective film. Adhesion can be improved to acceptable levels when the concentration of acrylic resin in the alloy is high enough. Usually at least about 50 wt. % is used. However, such high fractions of acrylic resin increase the brittleness of the film unacceptably and cause deterioriation of resistance to ultraviolet radiation, weatherability, chemicals and stains.

A variety of technological improvements directed toward utilizing multiple layers of different compositions and blends have been proposed.

U.S. Pat. No. 4,317,860 discloses a laminate comprising a layer of PVDF and a thermoplastic resin layer joined together over their entire surface by means of an intermediate layer of a polyalkyl methacrylate which is itself intimately united to the surfaces of the two polymer layers.

U.S. Pat. No. 4,364,886 discloses a method of forming a molded laminate by either compression or injection molding a polymer which is incompatible with PVDF onto the surface of a preformed laminate of PVDF and a polyalkyl methacrylate obtained by coextrusion of the PVDF and polyalkyl methacrylate. The PVDF layer can include copolymers of PVDF with other polymers or mixtures of PVDF with other polymers.

U.S. Pat. No. 4,677,017 discloses a multilayered coextruded film comprising a thermoplastic fluoropolymer layer, an adjacent thermoplastic polymer layer and an adhesive layer of a modified polyolefin, preferably ethylene vinyl acetate copolymer. therebetween.

U.S. Pat. No. 5,180,634 discloses coextruded multilayer sheet comprising a first outer layer consisting of a blend of PVDF, homopolymer or copolymer of elastomer-grafted, alkylmethacrylate, a layer of a homopolymer or copolymer of an elastomer-grafted alkylmethacrylate, and an optional intermediate layer of a homopolymer or copolymer of an alkylmethacrylate.

U.S. Pat. No. 5,256,472 discloses a fluorine resin type weather resistant film of multi-layer structure comprising a front surface layer of a major fraction vinylidene fluoride resin and a minor fraction of methacrylate resin, and a rear surface layer of a major fraction of methacrylate resin and a minor fraction of vinylidene fluoride resin and an ultraviolet light absorber.

U.S. Pat. No. 5,506,031 discloses a process that involves transferring a decoratine coating on a matte release layer onto an extruded plastic sheet. The release layer contains a low gloss agent and the decorative coating is transferred while pressure is applied by an embossing roll that forms deep three dimensional impressions in the outer surface of the decorative coating to provide a low gloss decorative coating that resembles natural wood grain.

WO 94/12583 discloses a heat transferable fluorinated resin multilayer film having a surface layer comprising a resin composition containing at least 60 wt % vinylidene fluoride resin and an adhesive layer of mainly a transparent acrylic resin having a glass transition temperature of 35° C.–90° C. The film can be laminated at a low heat transfer temperature of at most 110° C.

While these and other techniques have achieved some success in balancing weather, corrosion and stain resistance properties with adhesion of the protective coating to a substrate other problems remain. For example, traditional multilayer coatings are generally unable to adequately protect against scratching, chipping, cracking, peeling and similar deterioration resulting from the cumulative effect of impacts by foreign materials. For example, exterior vehicle body panels are constantly subject to being struck at high speed by dust, dirt and grit particles causing damage to the protective coating. Simlilarly, contact by wind-borne dirt, hail and contact with nearby objects is known to damage stationary surface coatings. Additionally, traditional protective coatings are typically rigid and brittle. Although very adhesive, they are susceptible to delamination from flexible or deflecting substrates such as thin sections of expansive building siding and awnings.

The protective coating for decoratively marked surfaces should excel in impact resistance, and optionally, in other performance criteria as well as being weather resistant, stainproof and adhesive. For example, in many applications they should be clear so that the underlying decoration shows through without distortion or haze. Yet further, it is often desired that the protective coating have a prescribed level of gloss or lack thereof. Hence, there still remains a need for a weatherproof, stainproof, adhesive, preferably clear protective coating adapted to providing a preferably low, preselected glossiness that also is highly impact resistant and is durable on flexible and deflecting substrates.

Accordingly, there is now provided by this invention a multilayer film comprising a protective layer of a blend comprising a fluorine substituted olefin polymer and an acrylic polymer, the protective layer being firmly bonded to a cushioning layer comprising an impact resistant polymer having an elastic modulus of less than 207 MPa and substantially free of any fluoropolymer.

There is also provided a multilayer film as just described further comprising a thermally adhesive layer bonded to the cushioning layer opposite the protective layer. which thermally adhesive layer comprises a blend comprising a fluorine substituted olefin polymer and an acrylic polymer. Each of the flourine substituted olefin polymer, acrylic polymer and impact resistant polymer components can independently comprise homopolymer, copolymer and blends thereof, respectively. The thermally adhesive layer provides strong bonding of the multilayer film to many substrate materials without the need for additional adhesive agents or primers.

Still further there is provided weather and stain resistant composite structure comprising a substrate having a decorative surface, and a multilayer film covering the substrate and comprising a protective layer of a blend comprising a fluorine substituted olefin polymer and an acrylic polymer, the protective layer being firmly bonded to a cushioning layer comprising an impact resistant polymer having an elastic modulus of less than 207 MPa and substantially free of any fluoropolymer, in which the decorative surface is thermally bonded to the cushioning layer.

The novel multilayer films and composite are useful for vibrantly and durably decorated vehicle body panels, building exteriors, flexible awnings, signs, bulkheads in passenger quarters of automobiles, trucks, trains, and airplanes, and the like.

DETAILED DESCRIPTION

Figure 1:
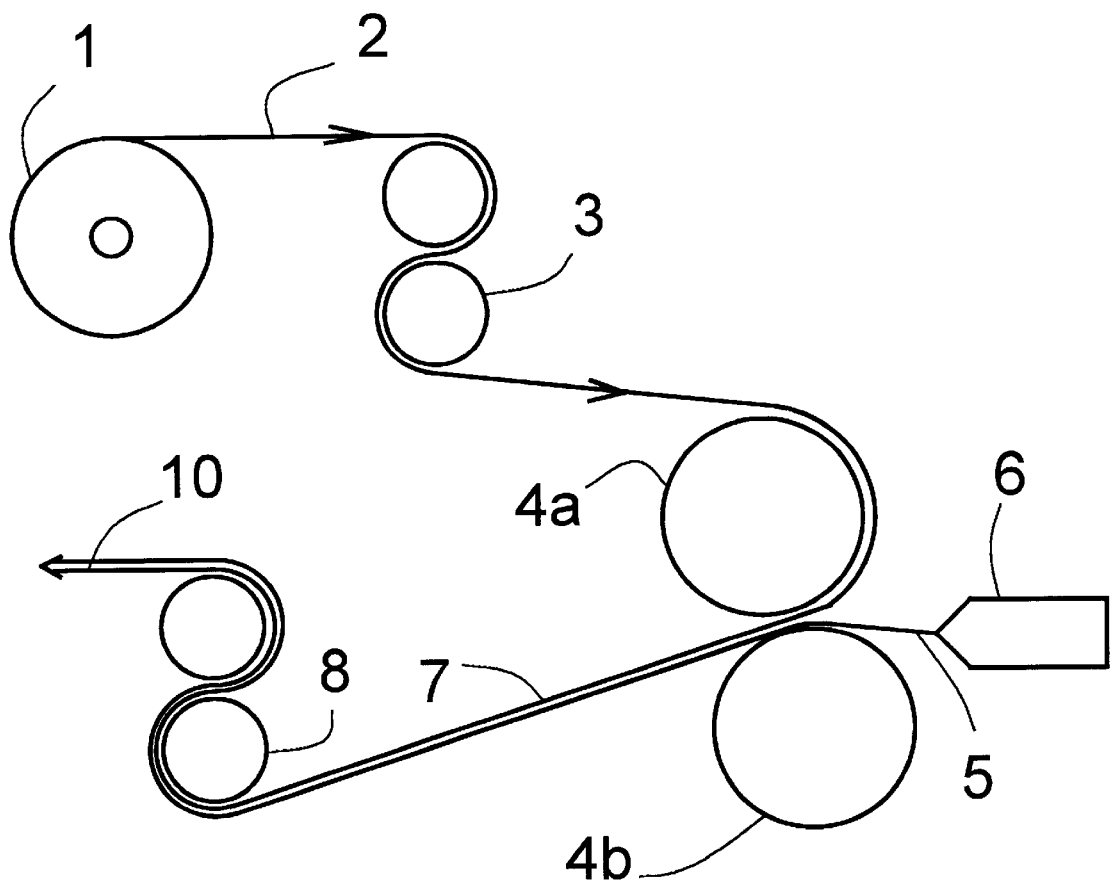
FIG. 1 is a schematic diagram of an laminating unit for use in adhering a multiltyer film of this invention onto a substrate sheet.

The present invention relates to a protective multilayer film incorporating a fluoropolymer/acrylic polymer alloy and its application in laminates on substrates. In a preferred embodiment, each layer of the film is optically clear. The film is particularly useful in production of a protective capstock or decorative film overlay on substratis effective to provide excellent thermal bondability to various thermoplastics substrates, rubbers, metal plates, signs and awnings, etc., and excellent resistance to chemicals. and stain. Very importantly, the novel multilayer film additionally provides excellent impact resistance, together with superior weatherability so as to protect substrates, such as vinyl siding, from aging, cracking, and color fading caused by long term outdoor exposure to harsh weather, solar irradiation and impinging contact of the protected article with dirt, grit, hail stones and other foreign objects.

In a basic embodiment, the multilayer film according to this invention has two layers, namely a protective layer and a cushioning layer. When applied to a substrate, the cushioning layer will be in contact with, and preferably adhered to the substrate while the protective layer will be exposed to the ambient environment. While each layer call provide multiple functions, the cushioning layer primarily contributes impact resistance, mechanical energy distribution and adhesion to the composite of film and substrate while the protective layer contributes weatherability, and corrosion and stain resistance.

In many applications all of the layers of the novel film can be optically clear to permit viewing of an underlying substrate with minimal obstruction. As used here, the term "optically clear" means that the film provides a minimum transmission of visible light. Thus the compositions for the individual layers should be selected to provide the multilayer film with a visible light transmission higher than about 70%, preferably higher than about 75%, and most preferably higher than about 80%. It is also preferred that the optically clear film have a haze value lower than about 4% more preferably lower than about 2% and most preferably lower than about 1%. Both visible light transmission and haze can be measured in accordance with ASTM D-1003. Alternatively, any one or more of the layers can contain an effective amount of pigment when a colored film is desired. If present, the pigment can render the film partially or completely opaque to visible light. Conventional pigments can be used.

The protective layer comprises a blend of a fluorine substituted olefin polymer occasionally referred to herein as "fluoroolefin polymer" and an acrylic polymer. The fluoroolefin polymer comprises about 45–95 weight parts per hundred parts of total polymer components ("pph") and accordingly the acrylic polymer comprises about –55 pph. Preferably, the composition comprises about 60–80 pph fluoroolefin polymer and 20–40 pph acrylic polymer. It should be understood that unless specifically indicated to the contrary, the term "polymer" or cognate term as used herein to describe a component of the novel multilayer film means a homopolymer or copolymer of the stated monomers and mixtures of such homopolymers and/or copolymers.

The fluorine substituted olefin polymer preferably comprises at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. Preferred fluoroolefin polymers include polyvinylidene fluoride (PVDF) and PVDF copolymers, such as vinylidene fluoride/hexafluoropropylene copolymer.

Many fluoroolefin polymers suitable for use in this invention are commercially available from suppliers in various grades. For example suppliers can supply multiple resins having nominally the same composition but different properties, such as different molecular weights to provide specific viscosity characteristics. It is contemplated that the fluoroolefin polymer component of the protective layer and/or thermally adhesive layer, discussed in detail below, can include a melt blend of multiple fluoroolefin polymers in place of one such polymer. Alloys of PVDF homopolymer and PVDF copolymer often provide the film with improved elastic modulus and gloss reduction and are preferred.

In the protective layer, the preferred acrylic polymer is a polymer comprising polymerized units of the following formula (I)

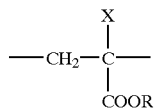

in which X=H, or an alkyl group having from 1–4 carbon atoms, and R=an alkyl group having from 1–4 carbon atoms, a glycidyl group or a hydroxyalkyl group having from 1–4 carbon atoms. Representative acrylic polymers include polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate and mixtures of these.

The cushioning layer composition should have many of the same properties that are desired in conventional multi-layer protective film adhesive layers. For example. the cushioning layer should have adequate compatibility with the protective layer and the substrate compositions to adhere well to both. Additionally, in high visible light transmission applications the cushioning layer should be optically clear so that decorative markings of the underlying substrate can be viewed through it. Preferably the cushioning layer should be durable and thus should be resistant to attack from radiation, oxidaltion, corrosion and similar degradation processes. Accordingly, it can incorporate minor but significant fractions of anti-degradation additives and adjuvants.

Importantly, the cushioning layer stands apart from conventional adhesive layer materials in that it comprises a low modulus polymer selected to significantly contribute superior impact resistance to the film. In general, the low modulus polymer of the cushioning layer should be somewhat resilient, pliant and flexible rather than brittle and hard. The cushioning layer serves to elastically absorb and distribute the energy that the film-protected article receives upon impact by hard objects in service. As a result, the film resists, scratching, chipping, cracking, peeling and similar behavior caused by being struck by objects. The rubbery nature of the cushioning layer also helps the film adhere to flexible and deflectable substrates such as awnings and curtains. To impart the desired elasticity, the low modulus polymer preferably should have an elastic modulus of at most about 30,000 lbs. per square inch ("psi"), i.e., less than about 207 MPa, more preferably at most about 25,000 psi, (172 MPa) and most preferably at most about 20,000 psi (138 MPa).

The low modulus polymer can also be characterized by impact resistance. Preferably, the low modulus polymer has an impact resistance of at least about 30 J/m, and more preferably at least about 70 J/m as measured by ASTM D-256. The cushioning layer of this invention thus can provide an impact resistance of the composite of the film ants substrate preferably at least about 6.8 N·m (60 in-lb$_f$) and more preferably at least about 7.9 N·m (70 in-lb$_f$) as measured by ASTM D-3679.

Representative low modulus polymers for use in this invention include impact-modified acrylic polymer, and impact-modified polyolefins such as poly(ethylene vinyl acetate), ethylene-propylene-diene monomer ("EPDM") copolymers, and low density polyethylene, such as linear low density polyethylene and very low density polyethylene produced using metallocene catalysts. Preferably, the low modulus polymer is a thermoplastic polymer selected from the group consisting of an impact-modified acrylic polymer, poly(ethylene vinyl acetate), metallocene-catalyzed polyolefin, and mixtures of thereof.

An impact-modified acrylic polymer is preferred for use in cushioning layer due to chemical similarity with the acrylic polymer which provides increased interlayer bonding between the cushioning and protective layers. The impact-modified acrylic polymer can contain a copolymer of monomers of acrylic monomers with an effective amount of suitable comonomer or graft moiety to produce the desired elastic modulus and impact resistance. An acrylic elastomer, sometimes referred to as acrylate rubber, polyacrylate rubber, polyacrylic elastomer or "ACM" and which is a composition based on a mixture of a polyacrylate and polymethacrylate, a polyacrylate and ethylene methacrylate copolymer ("EMAC"), [such as Chevron Chemicals EMAC 2260] or a polyacrylate and ethylene butylacrylate ("EBAC"] can be used. The compositions having the desired elastic modulus contain a major amount, that is greater than 50 wt. %, of the elastomer copolymer (e.g., EMAC or EBAC), and a minor amount of the polyacrylate.

Alternatively a suitable thermoplastic impact-modified acrylic polymer can be a blend of a clear glassy acrylic polymer, such as a plastic copolymer of ethylene and a carboxylic acid compound selected from acrylic acid, methacrylic acid and mixtures thereof, with elastomeric components, for example. Preferably the impact-modified acrylic polymer is present as a dispersion of fine particles of the elastomer dispersed uniformly in the plastic copolymer. Methods for making impact modified acrylic polymer as described by Thompson et al. in U.S. Pat. Nos. 5,079,296, 5,252,664 and 5,336,719, the full disclosures of which are hereby incorporated herein by reference may be used. Thompson describes transparent toughened thermoplastic blends prepared by blending 10 to 99 weight percent of a block copolymer; 0.1 to 1 weight percent of particulate rubber having a particle size from 0.1 to 10 microns; and the balance a clear glassy polymer.

Another suitable technique for making impact-modified acrylic polymer employs the use of a so-called "core/shell" products, such as Rohm and Haas' DR-101 resin. These generally are polymer particles which have a central core of one polymer surrounded by a shell of another polymer. The core can be either the plastic or elastomer component and the shell will be the opposite, i.e., elastomer or plastic component. Core/shell product particles are typically available as pellets of cylindrical, spherical or oval form having diameter of about 1.6 mm–12 mm. Suitable core/shell product particles have up to about 10 wt. % and usually about 5–10 wt. % of the elastomer component. Normally the core/shell particles are fed to a melt mixing apparatus, such as a melt extruder in which the core and shell domains are blended in the melt phase to form a homogeneous blend on a much smaller scale and a film is formed from the extrudate of this homogeneous blend.

The poly(ethylene vinyl acetate), sometimes referred to as "EVA", useful in this invention is broadly described as a random copolymer of ethylene and vinyl acetate. Preferably the vinyl acetate content in the EVA copolymer is in the range of about 10–40%. Increasing vinyl acetate content produces greater irregular morphology, lower crystallinity, more rubbery behavior, and higher adhesion.

A third preferred class of low modulus polymer suitable for the cushioning layer is linear very low density polyethylene and metallocene catalyzed polyolefin, especially metallocene catalyzed polyethylene. As used herein, "low density polyethylene" refers to conventional branched polymers of ethylene having a density of about 0.910 to 0.925 g/cc at 25 degrees C. In comparison, "medium density polyethylene" and "high density polyethylene" refer, respectively, to linear ethylene homopolymers having densities in the range of about 0.925 to 0.940 g/cc and 0.940 g/cc and greater. "Linear very low density polyethylene" refers to the conventional class of substantially linear polymers of ethylene having a density no greater than 0.910 g/cc. Where these density classifications are indicated for "ethylenic polymers" they include homopolymers and copolymers of ethylene with one or more comonomers.

Linear very low density ethylenic polymers suitable for use in the cushioning layer of the invention (hereinafter "LVLDPE") include substantially linear polymers of ethylene, with or without one or more comonomers, having a density from 0.850 to 0.900 g/cc and a narrow molecular weight distribution. Preferred comonomers for use in the copolymers include alpha-olefins at a mole percentage of 1 to 10 percent. While the LVLDPEs preferred for use in the invention are those polymerized with metallocene catalysts any low density, medium density or high density polyethylene, as well as LVLDPE ma be used provided the polymer has the density and molecular weight distribution combination to furnish acceptable elastic modulus values, clarity and adhesion to the protective layer and substrates.

As used herein, "metallocene-catalyzed" refers to polymerization catalyst systems such as the system disclosed in U.S. Pat. No. 5,191,052. The development of metallocene catalyzed polymer chemistry is reviewed in U.S. Pat. No. 5,770,318, and further description of metallocene catalyzed polyolefins is presented in U.S. Pat. Nos. 5,792,560 and 5,817,386. The entire disclosures of these patents are hereby incorporated herein by reference.

Metallocenes are complex combinations of a metal atom compound with cyclopentadienyl groups (Cp). The metallocenes are a "sandwich complex" arrangement of two Cp groups and a Group IV Transition Metal (Ti, Zr, Hf, Cr). Such catalysts are also named "single site" or "constrained geometry" catalysts. The metallocenes differ significantly in structure and reactivity from the Ziegler-Natta catalysts used in the conventional polymerization of ethylene polymers and copolymers. The metallocenes typically yield a narrow molecular weight distribution, uniform chain lengths, uniform comonomer distribution along the molecular chain and low bulk density in contrast to conventional catalysts for ethylenic polymers.

The metallocene catalyzed polymers are preferred because the metallocene catalysts are single site catalysts and they control the orientation of each monomeric unit added to the polymeric chain. The LVLDPE produced with these catalysts have a uniform compositional distribution and all polymer molecules within such materials have substantially similar compositions. Some copolymers prepared with metallocene catalysts contain long-chain branches within the ethylene backbone of the molecules. In contrast, conventional linear low density polyethylene typically does not contain long chain branches. Conventional ethylenic polymers have a wide compositional distribution and differ significantly in physical and mechanical properties, such as crystallinity, front metallocene polymers having substantially equivalent molar compositions and average molecular weights. For example, the metallocene catalyzed LVLDPE useful in the films of the invention are substantially amorphous thermoplastic materials, having a much lower crystallinity than conventional linear low density polyethylene.

It is preferable to use substantially linear ethylenic polymers/copolymers polymerized using metallocene catalyst systems because this type of catalyst provides thermoplastic polymers with a low density and very narrow molecular weight distribution (MWD). The MWD of polymers is commonly characterized by the polydispersity index (PI), i.e. the ratio between the weight average molecular weight and the number average molecular weight (Mw/Mn), each of which is calculated from molecular weight distribution measured by gel permeation chromatography (GPC). The PI values for metallocene catalyzed polyethylenes are very small, i.e. the MWDs are very narrow. The PI values of metallocene polyethylenese are usually lower than 3.5, and there are available industrial grades of substantially LVLDPE typically having PI in a narrow range 1.5–2.5. Narrow MWD, i.e. very uniform length of the macromolecular chains, along with extremely narrow and uniform comonomer and branches distribution leads to low crystallinity (less than 10%), high clarity and low film haze.

High optical quality film with haze typically less than about 3% is produced by using ethylenic resin with polydispersity preferably less than about 3.5, more preferably less than about 2.5, and most preferably less than about 2.3; density preferably less than about 0.905 g/cubic centimeter, and more preferably less than about 0.885 g/cubic centimeter; and crystallinity of preferably less than about 20%, by weight, more preferably less than about 15%, most preferably less than about 10%.

Ethylenic copolymer resin used to produce a cushioning layer according to the present disclosure should be chosen from ethylenic copolymers with a limited content of comonomers relative to ethylene monomer. The increase of the content of comonomer higher than about 10 mole % leads to a decrease in the melting and softening points of the resin to about 50° C.–75° C. This is undesirable because exposure to extreme temperature environments could cause low melting and/or softening multilayer films to delaminate and/or distort. Preferably the thermoplastic polymer should have a melting point in the range of about 90° C.–140° C.

Because polyolefins tend to have poor adhesion to substrates including other polymers due to the non-polarity of their molecules, the cushioning layer, especially in the two layer embodiment of the protective film according to the present invention, preferably contains a coupling agent to provide a good bond to substrates.

It would seem advantageous to include a fluoropolymer in the the cushioning later to achieve greater compatibility, and therefore improved adhesion to the protective layer. However, it has been discovered that adhesion is improved if fluoropolymer is absent. Additionally, fluoropolymer is usually among, if not the most expensive components of the film. Therefore, a fluoropolymer-free cushioning layer provides a more economical film. Thus it is preferred that the cushioning layer be substantially free of any fluoropolymer to provide superior impact resistance. "Substantially free" means that fluoropolymer may be present in trace amounts but fluoropolymer should not be in the cushioning layer at a concentration above about 1 part by weight per 100 parts by weight of low modulus polymer. Moreover, not only the fluorine substituted olefin polymers specifically identified above for use in the protective layer, but all types of fluoropolymers should be absent from the cushioning layer.

In a preferred embodiment, the multilayer film comprises three layers. The first layer is a protective layer as described above. A cushioning layer, also as previously described is adjacent the first layer. The third layer is a thermally adhesive layer adjacent the cushioning layer on the side opposite the first, protective layer. Accordingly, the cushioning layer is sandwiched between the protective layer and the thermally adhesive layer. In high visible light transmission applications the third layer should be opticlilty clear.

A primary purpose of the thermally adhesive layer is to promote adhesion of the substrate to the cushioning layer. It is desirable that the multilayer film of this invention be strongly adhered to the substrate. Many conventional techniques are useful for evaluating adhesion between film and substrate. By ASTM D-3559 adhesion should be at least about 90%, preferably at least about 95%, more preferably at least about 98%, and most preferably 100%.

The thermally adhesive layer can be further characterized as "self bondable". This means that the layer can be bonded to substrates, such as vinyl siding with heat and pressure alone. Additional adhesive components or primers are not needed.

Like the protective layer, the thermally adhesive layer comprises a blend of a fluoroolefin polymer and an acrylic polymer. However, the concentrations of these components is reversed. That is, the fluoroolefin polymer is present in this third layer at about 5–55 weight parts per hundred of the total fluorolefin and acrylic polymers, preferably 20–40 weight parts, and the acrylic polymer is a complementary amount. i.e., about 45–95 weight parts, preferably 60–80 weight parts.

In use the three layer film is preferably applied onto a substrate such that the thermally adhesive layer is adjacent the substrate and the protective layer is exposed to the ambient environment. The large concentration of acrylic polymer promotes strong bonding between the thermally adhesive layer and many substrates on which the multilayer film is intended to be placed. The existence of high acrylic polymer also renders the third layer comparatively brittle. However, the adjacent cushioning layer offsets this brittleness to provide a multilayer film with excellent impact resistance. Optionally, the acrylic polymer in the thermally adhesive layer can be or can include an impact-modified acrylic polymer.

Each of the layers of the multilayer film can contain one or more efficient UV-light absorber and/or stabilizer chemicals. UV-light absorbers within a layer block the transmission of ultraviolet wavelength light to protect underlying layers and UV-light stabilizers protect the layer containing the stabilizer from degradation caused by incident UV radiation. Large concentrations of a single UV-protective agent can migrate to the film surface over time. This phenomenon, referred to in the art as "bleeding" produces a rough and discolored surface which also blocks visible light transmission. A mixture of smaller amounts of multiple UV protective agents can be used to obviate the need to incorporate excessive amounts of a single agent and thus reduce bleeding. UV-light absorbers and stabilizers should be used in concentrations in the range from about 0.1 to about 10 parts by weight ("pbw"), and preferably in the range from about 0.25 pbw to about 1.5 pbw, where the parts by weight of absorber is based on 100 parts by weight of total polymer in the respective layer. When high visible light transmission is desired, care should be exercised to avoid adding so much absorber that optical clarity diminishes excessively.

A number of UV-light absorbers known in the industry can be used. Preferred are poly[[6-[(1,1,3,3-tetramethylbutyl)amino]-1,3,5-triazine-2,4-diyl][(2,2,6,6-tetrametlhyl-4-piperidinyl)imino]-1,6-hexanediyl[(2,2,6,6-tetramethyl-4-piperidinyl)imino]]) Chimassorb™ 944 Oligomeric Hindered Amine Light Stabilizer, 2-(2H-benzotriazol-2-yl)-4,6-ditertpentylphenol, Tinuvin® 328 Benzotriazole UV Absorber, 2-(2H-benzotriazol-2-yl)-4,6-bis(1-methyl-1-phenylethyl)phenol, Tinuvin® 234 Low volatile Benzotriazol UV Absorber, 2,2'-methylenebis(6-(2H-benzotriazol-2-yl)-4-1,1,3,3-tetramethylbutyl)phenol) Tinuvin®) 360 Very Low Volatile Benzotriazole UV Absorber, 2-(4,6-Diphenyl-1,3,5-triazin-2-yl)-5-(hexyl) oxyl-phenol, Tinuvin® 1577FF Low Volatile Hydroxyphenyl-Triazine UV Absorber, 2-[2-Hydroxy-3,5-di(1,1-dimethylbenzyl)phenyl]-wH-benzotriazole, Tinuvin® 900 all available from Ciba Specialty Chemicals Corporation, Switzerland/Germany; 2-hydroxy-4-methoxybenzophenone Cyasorb® UV9 light absorber, 2-(2-Hydroxy-5-t-octylphenyl)-benzotriazole, Cyasorb® UV 5411 light stabilizer. 2-Hydroxy-4-n-octoxybenzophenone, Cyasorb® UV-531 light absorber, 2-[4,6-Bis(2,4-dimethylphenyl)-1,3,5-triazin-2-yl]-5-(octyloxy)phenol Cyasorb® UV-1 164 light absorber, all available from Cytec Industries, Inc. West Paterson, N.J., and polymerizable benzotriazole Norblock™ absorber, available from Norainco Corporation (USA).

Other additives also can be incorporated to achieve special properties in the multilayer films. Examples of other additives include thermal stabilizers, such as octadecyl-3-(3,5-di-t-butyl-4-hydroxyphenyl)-propionate, Irganox® 1076 Phenolic Antioxidant, Ciba Specialty Chemicals, Tris (3,5-di-t-butyl-4-hydroxybenzyl)-isocyanurate, Cyanox® 1741 antioxidant and 1,3,5-Tris(4-t-butyl-3-hydroxy-2,6-dimethylbenzyl)-1,3,5-triazine-2,4,6-(1H,3H,5H)-trione blend with Tris(2,4-di-t-butylphenyl)phosphite Cyanox® 2777 antioxidant, Cytec Industries, nucleation agents, such as 3,4-dimethylbenzylidene sorbitol (Millad® 3998, Milliken Chemicals, Inman S.C.) gloss reduction agents such as all acrylic Paraloid EXL® 5136 and Paraloid KF-710 Gloss Reducing Additives and Paraloid® KM 377 PVC impact modifier and gloss reducer (Rohm and Haas Company, Philadelphia, Pa.), stearamidopropyldimethyl-2-hydroxyethylammonium nitrate Cyastat® SN and (3-lauramidopropyl)trimethylammonium methyl sulfate Cyastat® LS antistatic agents (Cytec Industries, Inc.), infrared light blocking agents, and the like, provided the additives are compatible with the polymers of the layer(s) in which they are placed. For example, where high visible light transmission is desired, the presence of additives should not significantly interfere with such transmission. Preferably, the total amount of additives should not exceed about 10 pbw per 100 pbw polymer in a layer.

Total thickness of the multilayer film as applied to a substrate is generally within the range of about 3 to about 100 μm, preferably about 7 to about 50 μm, and more preferably about 12.5 to about 25 μm. The thickness of the film in any particular application can depend upon the nature of the substrate, degree of protection, and utility to which the composite of film on substrate is directed. For example, in protection of vinyl siding on building exteriors, a high degree of transparency is usually desirable for unobstructed and true color display of the siding and low cost of materials is usuall very important. In such a case, a total film thickness less than about 30 μm is recommended.

In a two-layer film according to this invention, the protective layer should occupy a smaller fraction of total thickness than the cushioning layer. Preferably the protective layer will be about 5–50% of the total thickness and the balance will be cushioning layer. In a three-layer film, the protective layer preferably should be about 5–50% of the total film thickness, more preferably about 20–35% and most preferably about 25–30%. the cushioning layer preferably should be about 20–90% more preferably about 30–50%, and most preferably about 33% and the thermally adhesive layer should make up tile balance of the thickness. Each of the protective layer and the thermally adhesive layer should be at least about 5% of the total thickness to provide adequate protection and adhesion, respectively.

This invention is now illustrated by examples of certain representative embodiments thereof, wherein all parts, proportions and percentages are by weight unless otherwise indicated. Units of weight and measure not originally obtained in SI units have been converted to SI units.

The following materials were used in the examples described below:

| Material | Composition | Source |
|---|---|---|
| Fluoroolefin Polymer A | PVDF homopolymer | Solef 1010/0001, Solvay Corporation |
| Fluoroolefin Polymer B | 85 wt % vinylidene fluoride/ 15 wt % hexafluoropropylene copolymer | Solef 21510/0001, Solvay Corporation |
| Acrylic Polymer A | polymethyl methacrylate (PMMA) | V920, Rohm and Haas Company |
| Acrylic Polymer B | impact modified PMMA | DR 101, Rohm and Haas Company |
| Acrylic Polymer C | impact modified PMMA | Acrylate ZK6, Cyro Industries |
| Acrylic Polymer D | PMMA | Grade H15, Cyro Industries |
| Acrylic Polymer E | Ethylene methacrylate copolymer (EMAC) | EMAC 2260, Chevron Chemicals |
| Acrylic Polymer F | Acid/Acrylate-modified ethylene vinyl acetate polymer | Bynel ® 3101, E. I. du Pont de Nemours & Co. |
| UV Absorber A | 2-hydroxy-4-methoxybenzophenone | Cyasorb ® UV 9, Cytec Industries |
| UV Absorber B | 2-[4,6-Bis(2,4-dimethyl phenyl)-1,3,5-triazin-2-yl]-5-(octyloxy)phenol | Cyasorb ® UV-1164, Cytec Industries |
| UV Absorber C | 2-(2-Hydroxy-5-t-octylphenyl)-benzotriazole | Cyasorb ® UV 5411, Cytec Industries |
| UV Absorber D | 2-Hydroxy-4-n-octoxybenzophenone | Cyasorb ® UV 531, Cytec Industries |
| UV Stabilizer A | poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperi-dinyl)imino]]) | Chimassorb ™ 944, Ciba Specialty Chemicals |
| Antioxidant A | 1:2 blend of 1,3,5-Tris (4-t-butyl-3-hydroxy-2,6-dimethyl benzyl)-1,3,5-triazine-2,4,6-(1H,3H,5H)-trione with Tris (2,4-di-t-butylphenyl) phosphite | Cyanox ® 2777, Cytec Industries |
| Antioxidant B | Tris (3.5-di-t-butyl-4-hydroxy benzyl)-isocyanurate | Cyanox ® 1741, Cytec Industries |
| Nucleation Agent | 3,4-dimethylbenzylidene sorbitol | Millad ® 3998, Milliken Chemicals |
| Gloss Reduction Agent A | acrylic | Paraloid EXL ® 5136, Rohm and Haas |
| Gloss Reduction Agent B | acrylic | Paraloid KF-710, Rohm and Haas |

EXAMPLES

Examples 1–3

A composition (Ex. 1) for a protective layer was made of

| Component | parts | pph |
|---|---|---|
| Fluoroolefin Polymer A | 69.2 | 70 |
| Acrylic Polymer A | 5.9 | 6 |
| Acrylic Polymer B | 23.8 | 24 |
| UV Absorber A | 0.3 | 0.3 |
| UV Stabilizer A | 0.15 | 0.15 |
| Antioxidant A | 0.15 | 0.15 |
| Nucleation Agent | 0.5 | 0.5 |

After drying overnight at 71° C. polymer pellets were tumble mixed with powdered components for several minutes to obtain a uniform mixture. The mixture was then melt blended in a 5 cm screw diameter Werner & Pfleiderer intermesh corotating, twin screw extruder to obtain a compound. Melt temperature was in the range of 193 to 227° C. along the extruder barrel, and from 221 to 232° C. at the die plate. Screw speed was in the range from 80 to 100 rev./min. and the flow through the extruder generated output in the range of 13.6 to 27.2 kg/hour. The extrudate was pelletized, quenched in water and the pellets were dried at 60° C. in a forced air circulating oven for greater than 4 hours before using to make film sample.

Ethylene methacrylate copolymer ("EMAC") resin (Chevron Chemicals EMAC 2260) pellets were oven dried as in Example 1 to provide a cushioning layer composition (Ex. 2).

A thermally adhesive layer composition (Ex. 3) was prepared as in Example 1 from the following components:

| Component | parts | pph |
|---|---|---|
| Fluoroolefin Polymer A | 29.8 | 30 |
| Acrylic Polymer A | 13.9 | 14 |
| Acrylic Polymer B | 55.5 | 56 |
| UV Stabilizer A | 0.15 | 0.15 |
| Antioxidant A | 0.15 | 0.15 |
| Nucleation Agent | 0.5 | 0.5 |

These components were dried, tumble mixed, and melt blended as in Example 1 to form a thermally adhesive layer composition.

The compositions were compression molded for 3 minutes at 216° C.–227° C. and 27.6 MPa (4000 psi) in a Carver Corporation laboratory hot press to form 0.102 mm thickness, monolayer films. Ex. 1 film was pressed in different trials within release sheets of Kapton® polyimide and Teflon® polytetrafluoroetheylene embossing films to produce a matte finish film sample. Ex. 2 and Ex. 3 films were pressed between two 15.24 cm×15.24 cm polished ferro-plates. These films were glossy. Ultraviolet light transmission at 300 nm wavelength was measured as shown in Table I. UV absorber in the Ex. 1 composition is deemed responsible for the low UV light transmission.

TABLE I

| | Release Sheet | UV transmission % |
|---|---|---|
| Ex. 1 | polyimide | 0.17 |
| | polytetrafluoro-ethylene | 0.20 |
| Ex. 2 | none | 17.5 |
| Ex. 3 | none | 11.5 |

Example 4

A monolayer film of a protective layer composition was produced by melt blending of the following components.

| Component | parts | pph |
|---|---|---|
| Fluoroolefin Polymer B | 69.2 | 70 |
| Acrylic Polymer C | 29.7 | 30 |
| UV Absorber A | 0.5 | 0.5 |
| UV Stabilizer A | 0.15 | 0.15 |
| Antioxidant A | 0.15 | 0.15 |
| Nucleation Agent | 0.3 | 0.3 |

The components were dried and then melt blended as in Example 1. The melt as extruded in a 24:1 L/D ratio 5 cm diameter Killion single screw extruder equipped with a 45.7 cm, nickel plated coat hanger die onto a 50.8 cm diameter chrome surface casting drum to obtain films of 0.025 and 0.020 mm thickness. UV transmission of these films was measured as in Examples 1–3 to be 0.1 and 2.1%, respectively.

Example 5

A thermally adhesive layer composition was prepared from the following components which were prepared and blended as described in Example 4.

| Component | parts | pph |
|---|---|---|
| Fluoroolefin Polymer B | 29.8 | 30 |
| Acrylic Polymer C | 69.4 | 70 |
| UV Absorber A | 0.5 | 0.5 |
| UV Stabilizer A | 0.15 | 0.15 |
| Antioxidant A | 0.15 | 0.15 |

The composition was formed into films of 0.025, 0.019, 0.013, and 0.005 mm thicknesses in accordance with the procedure of Ex. 4. The UV transmission of these films was found to be 2.5, 4.5, 5.4 and 14.5%, respectively.

Examples 6 and 7

Three compositions were prepared from the following components.

| | parts | pph |
|---|---|---|
| Composition A | | |
| Fluoropolymer B | 68.4 | 70 |
| Acrylic Polymer D | 29.3 | 30 |
| UV Absorber C | 1.0 | 1.0 |
| UV Stabilizer A | 0.15 | 0.15 |
| Antioxidant A | 0.15 | 0.15 |
| Gloss Reduction Agent B | 1.0 | 1.0 |
| Composition B | | |
| Acrylic Polymer E | 98.4 | 100 |
| UV Absorber C | 1.0 | 1.0 |
| UV Stabilizer A | 0.3 | 0.3 |
| Antioxidant A | 0.3 | 0.3 |
| Composition C | | |
| Fluoropolymer B | 29.5 | 30 |
| Acrylic Polymer D | 68.9 | 70 |
| UV Absorber C | 1.0 | 1.0 |
| UV Stabilizer A | 0.3 | 0.3 |
| Antioxidant A | 0.3 | 0.3 |

The components were dried and tumble blended to form dry mixtures which were then each independently melt blended as in Example 1. The three compositions were processed through a Killion multiple layer film coextrusion unit operating with three, 24:1 L/D ratio single screw extruders feeding a 35.6 cm wide coat hanger die through a three layer feed block to form a film on a chromed casting drum in a three roll stack unit.

A two layer film (Ex. 6) was produced by coextruding composition A onto an approximately equal thickness of composition B. Similarly, a three layer film (Ex. 7) of top layer composition A, middle layer composition B and bottom layer composition C was made. Extruder barrel temperatures were in the range of 204–243° C. for compositions A and C in the range of 171–221° C. for composition B to maintain the melt viscosity of the compositions about the same. Feed block and die temperatures were in the range of 232–249° C., the extruders screw speeds were 90 rev./min. and the film traveled at 0.3–0.5 m/s. Thicknesses of top, middle and bottom layers were about 35%, 30% and 35% of the total, respectively. Each of the two and three layer films was produced to 0.025, 0.019, 0.013 mm total thickness. UV transmission for these films are shown in Table II.

TABLE II

| | UV Transmission 300 nm (%) | |
|---|---|---|
| Thickness, mm | Ex. 6 | Ex. 7 |
| 0.025 | 1.8 | 1.8 |
| 0.019 | 2.7 | 4.5 |
| 0.013 | 11.8 | 11.6 |

Example 8 and Comparative Examples 9 and 10

A 0.013 mm thickness three layer film of Ex 7 was laminated onto blue non-weatherable PVC building siding substrate (substrate 1), using equipment illustrated schematically in FIG. 1. PVC pellets were melt extruded in a 5 cm diameter single screw extruder (not shown) at about 180–185° C. barrel temperature and 185° C. die temperature. A 40 cm by 1 mm PVC sheet die 6 was used to extrude the PVC sheet 5 at 0.2 m/s with sheet temperature at the die in the range of 190–207° C. The three layer film 2 was unrolled from a spool 1 and fed through rolls 3 for tension control to an embossing station. The film was embossed and laminated to the hot PVC sheet 5 between embossing drum 4a and back up roll 4b. The PVC sheet laminated with protective film 7 was tensioned between rolls 8 then removed at 10 for profile shaping, cooling, cutting and packaging in conventional equipment.

The impact resistance and adhesion of the sample (Ex. 8) were measured by falling dart test ASTM D3679 and by peel test ASTM D3359, respectively. Results are shown in Table III. The adhesion test involved cutting a 10×10 matrix of equal area squares through the film, applying a pressure sensitive adhesive tape onto the matrix, peeling the tape off the surface and reporting an adhesion value calculated as 100 minus the number of squares removed by the tape.

For comparison, two layer films of 20 μm (Comp. Ex. 9) and 30 μm (Comp. Ex. 10) thicknesses and of the composition disclosed in U.S. Pat. No. 5,123,164 were obtained from the manufacturer (Denka Corp., Japan). The films had a top layer of a 70% PVDF/30% acrylic resin blend and a bottom layer of about equal thickness to the top layer of a 30% PVDF/70% acrylic resin blend. The two layer films were laminated onto pieces of the same non-weatherable PVC siding composition as Ex. 8 (substrate 1). Adhesion and impact resistance were measured as above.

Light transmission of the samples was determined by visual inspection. All samples were were found to be acceptable. Clarity of Ex. 8 is predicted to be better than Comp. Exs. 9 and 10 by at least about 35 and 60%, respectively based on the reduced thickness of the novel film. Table III also shows that all composites had excellent film adhesion. Significantly, the novel three layer film on PVC substrate was able to maintain the high impact resistance of the uncoated substrate while the conventional two layer films reduced impact resistance by 26.1 and 22.7%.

TABLE III

|  | Film Thickness μm | Adhesion Value | Impact Resistance N-m (in-lb) |
|---|---|---|---|
| Substrate 1 | — | — | 9.9 (88) |
| Ex. 8 | 13 | 100 | 9.9 (88) |
| Comp. Ex. 9 | 20 | 100 | 7.3 (65) |
| Comp. Ex. 10 | 30 | 100 | 7.7 (68) |

Example 11 and Comparative Examples 12 and 13

A composite was prepared from the following components:

|  | parts | pph |
|---|---|---|
| Composition D |  |  |
| Fluoroolefin Polymer A | 40.53 | 42 |
| Fluoroolefin Polymer B | 27.02 | 28 |
| Acrylic Polymer D | 28.95 | 30 |
| UV Absorber B | 0.7 | 0.72 |
| UV Absorber C | 0.7 | 0.72 |
| UV Absorber D | 0.25 | 0.26 |
| Antioxidant B | 0.35 | 0.36 |
| Gloss Reduction Agent | 1.5 | 1.5 |
| Composition E |  |  |
| Acrylic Polymer F | 98 | 100 |

-continued

|  | parts | pph |
|---|---|---|
| UV Absorber B | 0.7 | 0.7 |
| UV Absorber C | 0.7 | 0.7 |
| UV Absober D | 0.25 | 0.25 |
| Antioxidant B | 0.35 | 0.35 |

The components were dry blended to form mixtures which were then coextruded to form multilayer films, according to the procedures of Exs. 6 and 7. Two layer film, Example 11 was made of layer compositions D/E. A rubber embossing roll roughened by sanding with 60 grit abrasive was pressed onto the top layer (D) during coextrusion to reduce gloss. Overall thickness of the film was 15.24 μm. The layers were about equal thickness within the film. The film was laminated onto non-weatherable PVC siding substrate (substrate 2). For comparison, two layer films as in Comparative Examples 9 and 10 were also laminated onto a PVC siding substrate (substrate 3). The samples were tested for impact resistance, adhesion and gloss and results are shown in Table IV.

Data in Table IV show that conventional films significantly reduced the impact resistance of the substrate material and the novel multilayer films did not. Adhesion of the novel two layer film met performance criteria. Moreover, the novel films produced much less gloss than did the conventional coatings.

TABLE IV

|  | Layers No. | Film Thickness μm | Impact Resistance N-m (in-lb) | Gloss 75° TAPPI[:] | Room Temp. Adhesion[+] |
|---|---|---|---|---|---|
| Substrate 2 | 0 | 0 | 13.1–13.6 (116–120) | 27–34 | — |
| Ex. 11 | 2 | 15.24 | 14.5 (128) | 31–38 | 100 |
| Substrate 3 | 0 | 0 | 8.6 (76) | 18–22 | — |
| Comp. Ex. 12 | 2 | 20 | 7.3 (65) | 84–87 | 100 |
| Comp. Ex. 13 | 2 | 30 | 7.7 (68) | 84–87 | 100 |

[:]ASTM D-2457
[+]ASTM D-3359

Examples 14 and 15 and Comparative Examples 16 and 17

Composites were prepared from the following components:

|  | parts | pph |
|---|---|---|
| Composition F |  |  |
| Fluoroolefin Polymer A | 29.55 | 30 |
| Acrylic Polymer B | 34.475 | 35 |
| Acrylic Polymer D | 34.475 | 35 |
| UV Absorber B | 0.5 | 0.51 |
| UV Absorber C | 0.5 | 0.51 |
| UV Absober D | 0.2 | 0.2 |
| Antioxidant B | 0.3 | 0.3 |
| Composition G |  |  |
| Acrylic Polymer B | 98 | 100 |
| UV Absorber B | 0.7 | 0.71 |
| UV Absorber C | 0.7 | 0.71 |

-continued

| | parts | pph |
|---|---|---|
| UV Absorber D | 0.25 | 0.26 |
| Antioxidant B | 0.35 | 0.36 |

A two layer film (Example 14) of Composition D (Ex. 11) bonded to Composition G, and a three layer film (Example 15) of layers D/G/F were prepared as above. The two layer film of D/G composition and the three layer film of D/G/F composition were coextruded separately and then laminated to pigmented PVC substrates (substrates 4 and 5) by the procedure of Ex. 11. Both films were about 16.5 μm thick and the layers were about equal fractions of the total film thickness. Adhesion and impact resistance of the films and the uncoated substrates (Comp. Ex. 16 and 17) were measured as before and are reported in Table V. These examples demonstrate that superior impact resistance can be obtained from use of the two and three layer films of this invention.

TABLE V

| | Layer Compositions | Adhesion+ | Impact Resistance N-m (in-lb) |
|---|---|---|---|
| Comp. Ex. 16 | Substrate 4 | | 12.6 (112) |
| Ex. 14 | D/G/Substrate | 100 | 13.6 (120) |
| Comp. Ex. 17 | Substrate 5 | | 13.6 (120) |
| Ex. 15 | D/G/F/Substrate | 100 | 15.4 (136) |

+ASTM D-3359

Although specific forms of the invention have been selected for illustration and tile preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope end spirit of the following claims.

What is claimed is:

1. A multilayer film comprising
   a protective layer of a blend comprising a fluorine substituted olefin polymer and an acrylic polymer,
   a cushioning layer bonded to the protective layer and comprising an impact resistant polymer having an elastic modulus of less than 207 MPa and being free of any a fluoropolymer, and
   a thermally adhesive layer in direct contact with the cushioning layer opposite the protective layer, and comprising a blend comprising a fluorine substituted olefin polymer and an acrylic polymer.

2. The multilayer film of claim 1 in which the thermally adhesive layer is free of adhesive primers.

3. The multilayer film of claim 1, in which the impact resistant polymer has an impact resistance of at least 30 J/m as measured by ASTM D-256.

4. The multilayer film of claim 3 in which all of the protective layer, the cushioning layer and the thermally adhesive layer have visible light transmission higher than 70% and haze less than 4%.

5. The multilayer film of claim 1 in which
   the impact resistant polymer is a thermoplastic polymer selected from the group consisting of an impact-modified acrylic polymer, polyethylene vinyl acetate), metallocene catalyzed polyolefin, and a mixture of them,
   the protective layer comprises about 45–95 parts by weight of a first fluorine substituted olefin polymer and about 5–55 parts by weight of a first acrylic polymer, and
   the thermally adhesive layer comprises 5–55 parts by weight of a second fluorine substituted olefin polymer and 45–95 parts by weight of a second acrylic polymer,
   in which the first and second fluorine substituted olefin polymers each is independently a fluorine substituted olefin polymer comprising a monomer selected from the group consisting of vinylidene fluoride, vinylfluoride, tetrafluoroethylene, hexafluoropropylene, trifluoroethylene, chlorotrifluoroethylene, ethylene-chlorotrifluoroethylene, and mixtures thereof, or a blend of such fluorine substituted olefin polymers,
   in which the first and second acrylic polymers each independently comprise polymerized units of the following formula (I)

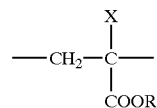

in which
   X=H, or an alkyl group having from 1–4 carbon atoms, and
   R=an alkyl group having from 1–4 carbon atoms, a glydidyl group or a hydroxyalkyl group having from 1–4 carbon atoms,
   and all parts by weight are based on 100 parts by weight of total polymer components present in each layer.

6. The multilayer film of claim 5 in which the impact-modified acrylic polymer is present as a melt blend of particles having a core of a first composition and a shell surrounding the core of a second composition, and in which one of the two compositions comprises a copolymer of ethylene and a carboxylic compound selected from the group consisting of acrylic acid, methacrylic acid and mixtures thereof, and the other of the two compositions is an elastomer.

7. The multilayer film of claim 5 in which the impact-resistant polymer consists essentially of poly(ethylene vinylacetate).

8. The multilayer film of claim 5 in which the impact-resistant polymer consists essentially of a metallocene catalyzed polyolefin homopolymer, copolymer or mixture thereof and an adhesive promoting additive effective to improve adhesion between the impact-resistant polymer and adjacent layers.

9. The multilayer film of claim 5 in which the metallocene catalyzed poly olefin is polyethylene homopolymer, copolymer or mixture thereof.

10. The multilayer film of claim 1, in which the thermally adhesive layer has a composition identical to the protective layer.

11. The multilayer film of claim 1 in which at least one layer further comprises about 0.1–10 parts by weight per 100 parts of total polymer present in said layer of an ultraviolet light absorbing adjuvant, provided that said layer has visible light transmission higher than 70% and haze less than 4%.

12. A weather and stain resistant composite structure comprising
   a substrate having a decorative surface, and
   a multilayer film covering the substrate and comprising a protective layer of a blend comprising a fluorine substituted olefin polymer and an acrylic polymer, a cushioning layer bonded to the protective layer and comprising an impact resistant polymer having an elastic modulus of less than 207 MPa and being free of any fluoropolymer, and a thermally adhesive layer between the cushioning layer and the substrate and in direct contact with the cushioning layer, which thermally adhesive layer comprises a blend of a fluorine substituted olefin polymer and an acrylic polymer.

13. The weather and stain resistant composite structure of claim 12 in which the structure has an impact resistance of at least 6.8 N·m as measured by ASTM D3679.

14. The weather and stain resistant composite structure of claim 13 in which the substrate is a rigid structure selected from among a vehicle body panel, building siding, window frame, interior wall of a living space and a sign board.

15. The weather and stain resistant composite structure of claim 13, in which the substrate is a flexible structure selected from among a fabric, a curtain and an awning.

* * * * *